United States Patent [19]

Yigdall et al.

[11] Patent Number: 4,738,702
[45] Date of Patent: Apr. 19, 1988

[54] GLASS MELTING IN A ROTARY MELTER

[75] Inventors: Jeffrey S. Yigdall, Chehalis, Wash.; Yih-Wan Tsai, O'Hara Township, Allegheny County, Pa.

[73] Assignee: PPG Industries, Inc., Pittsburgh, Pa.

[21] Appl. No.: 915,763

[22] Filed: Oct. 6, 1986

[51] Int. Cl.⁴ ............................................... C03B 5/16
[52] U.S. Cl. .......................................... 65/27; 65/135; 65/136; 65/335; 65/347
[58] Field of Search ................... 65/27, 135, 136, 335, 65/347, 134

[56] References Cited
U.S. PATENT DOCUMENTS
4,521,238  6/1985  Heithoff ................................ 65/135

Primary Examiner—Arthur Kellogg
Attorney, Agent, or Firm—Andrew C. Siminerio

[57] ABSTRACT

The circulation of exhaust gas within a heating vessel is controlled to reduce the adverse effects of the abrasive and corrosive exhaust gas on exposed interior surfaces of the vessel. The firing rates of the burners in the vessel may be varied to alter the flow patterns within the vessel. Additional jet burners with high exhaust gas velocity may be used to direct their exhaust flow in a direction opposing the exhaust flow of other selected burners. Burners may also be angled so as to reduce the flow component of the exhaust gas that may pass over the exposed interior surfaces of the vessel.

16 Claims, 3 Drawing Sheets

GLASS MELTING IN A ROTARY MELTER

BACKGROUND OF THE INVENTION

1. Field of the Invention

This invention relates to heating vessels and in particular, to modifying the circulation of exhaust gas within a high temperature liquifying furnace.

2A. Technical Considerations

One type of glass melting process entails feeding glass batch materials onto a pool of molten glass contained within a tank-type melting furnace and applying thermal energy to melt the materials into the pool of molten glass. The melting tank conventionally contains a relatively large volume of molten glass so as to provide sufficient residence time for currents in the molten glass to effect some degree of homogenization before the glass is discharged to a forming operation. These recirculating flows in a tank type melter may result in inefficient use of thermal energy. Conventional overhead radiant heating is inefficient in that only a portion of its radiant heat is directed downward towards the material being melted.

As an alternative to tank type glass melting furnaces as described above, U.S. Pat. No. 4,381,934 to Kunkle and Matesa, which teachings are incorporated by reference, discloses an intensified batch liquefaction process in which large volumes of glass batch materials are efficiently liquefied in a relatively small liquefaction vessel. This type of process, particularly when using intensified heat sources such as oxygen-fuel burners, produces relatively small volumes of high temperature exhaust gases. The heat from this exhaust gas can be recovered and used to directly heat a batch stream feeding the liquefaction vessel so as to improve the overall efficiency of the process.

During the heating and melting process, it is believed that certain components of the batch material vaporize. These vapors may be corrosive and when combined with the hot exhaust gas stream that circulates through the vessels of the type disclosed in U.S. Pat. No. 4,381,934, may corrode exposed interior surfaces. In addition, the exhaust gas may entrain particulate matter within the vessel which may act as an abrasive to exposed interior surface.

An exhaust outlet on the lid of the vessel, for example, but limited to that disclosed in the two-stage batch liquefaction process as of U.S. Pat. No. 4,519,814 to Demarest, which teachings are incorporated by reference, may potentially lead to further process limitation due to the circulation of the hot exhaust gas in the vessel. Most of the exhaust gas must exit the vessel through the exhaust outlet. As as result there will be greater exhaust flow and corresponding wear. Furthermore, as pressure builds up within the vessel, the exhaust outlet provides a pressure relief outlet resulting in a high velocity exhausting of the exhaust gas. As a consequence, the vessel in the vicinity of the exhaust duct outlet may have increased wear when compared to the remaining exposed portions of the vessel. The potential wear problem may be particularly pronounced when the exhaust outlet is off center from the rotational centerline of the liquefaction vessel. The circulation of the exhaust gas within the vessel may be slowed in the direction of the exhaust outlet, establishing an asymmetric circulation within the vessel that may result in accelerated vessel wear at exposed portions. The problem may be complicated even further if the burners are positioned asymmetrically in the vessel so as to further distort the circulation pattern within the vessel.

It would be advantageous to control the exhaust gas circulation within the heating vessel so as to minimize the limitations discussed above.

2B. Patents of Interest

U.S. Pat. No. 2,006,947 to Ferguson teaches a centrifugal glass melting furnace with angularly adjustable burners. The furnace includes a steel shell with heat insulating liner mounted for rotation about a vertical axis. Burner openings in a stationery cover above the shell are directed obliquely outward from the axis of rotation of the rotating furnace vessel so that flames from the burners strike batch material on the insulating liner of the steel shell. The burners are oriented to direct their flame generally in the direction of rotation of the furnace.

U.S. Pat. No. 2,834,157 to Bowes teaches a glass melting furnace having an inverted frusto-conical hearth. A cover is supported over the hearth such that the hearth can rotate under the cover. The cover includes a plurality of spaced apertures for insertion of fuel nozzles which direct flames into the interior of the furnace. The flames follow a generally tangential path with respect to the walls of the furnace.

None of the cited art recognizes or discusses the problems that can occur in these types of systems such as particle entrainment in exhaust gas and accelerated wear of the furnace.

SUMMARY OF THE INVENTION

An object of the present invention is to provide a heating vessel, e.g., for liquefying glass batch, wherein the circulation patterns of the exhaust gas within the vessel are controlled to reduce the abrasive and corrosive effects of the exhaust gas on portions of the vessel. Exhaust gas from burners within the vessel flows down over a first batch surface and up an opposite second batch surface, collecting particulate material as it passes thereover. The present invention controls this circulation pattern by directing the exhaust gas away from the second batch surface to reduce the amount of particulate material entrained in the exhaust gas and reduce the contact between the particulate entrained exhaust gas and exposed surface portions of the vessel. The circulation pattern may be controlled by selecting firing rates for each burner so as to alter the flow of the exhaust gas and direct it away from the second batch surface. When the vessel includes a lid with an exhaust outlet, the burners nearest the outlet are preferably fired at a higher rate than those burner further from the outlet.

Another object of this invention is to control exhaust gas circulation within the heating vessel by utilizing high exhaust gas velocity jet burners to direct their exhaust in a direction opposing the flow of exhaust gas over the second batch surface from other burners within the vessel. The jet burners may be positioned in close proximity to the exhaust gas outlet in the lid of the vessel.

Still another object of the invention is to control exhaust gas circulation within the heating vessel by angling selected burners so as to reduce the flow component of the exhaust gas that travels down the first batch surface and thus reduce the corresponding exhaust gas circulation over the second batch surface.

DETAILED DESCRIPTION OF THE INVENTION

This invention is suitable for use in a process wherein a hostile environment adversely affects exposed interior surfaces of a vessel. It is particularly well suited for use in a heating process where high temperatures and additional conditions within a heating vessel, such as circulation of corrosive and abrasive materials, accelerate the wear of portions of the lid of the heating vessel. The invention is presented in connection with a two-stage glass batch liquefaction process of type taught in U.S. Pat. No. 4,519,814 but it is to be understood that the invention can be used in any heat related process potentially having similar problems.

Figure 1:
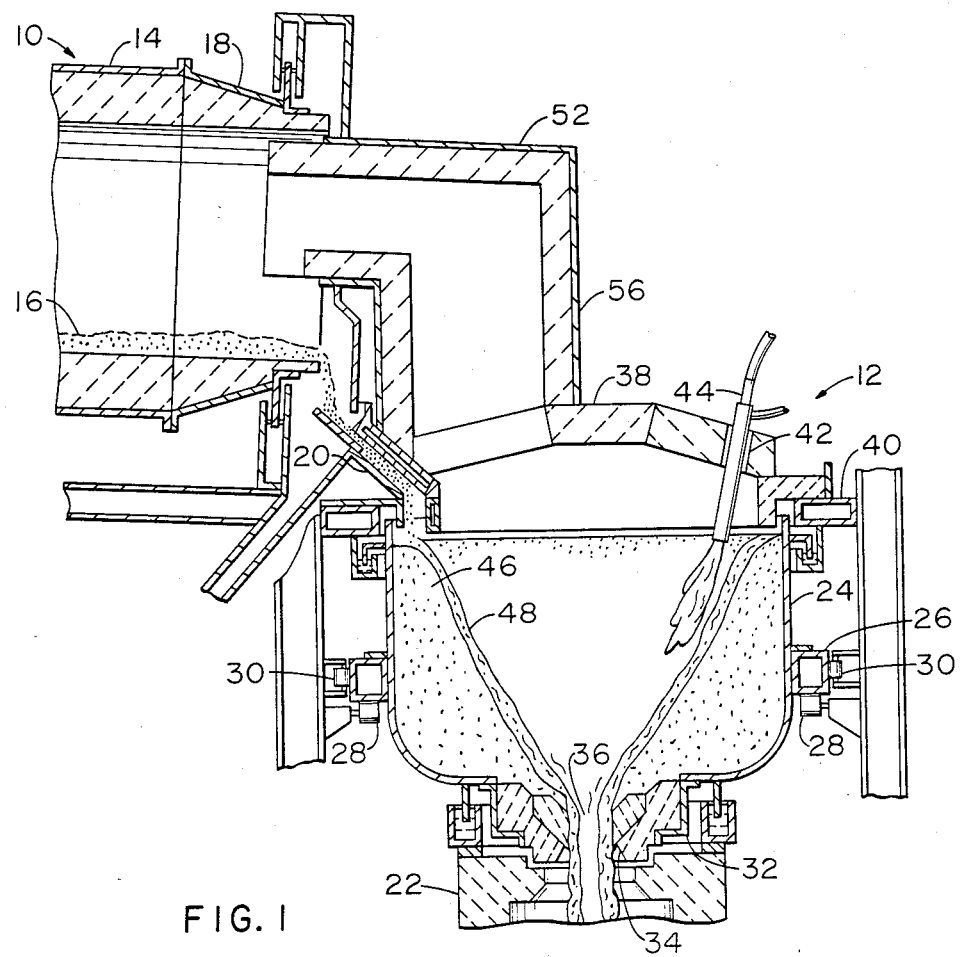
FIG. 1 is a cross-section of the discharge portion of a kiln and a liquefaction vessel in a two-stage liquefaction process.

FIG. 1 illustrates a rotary kiln 10 as it feeds batch material 16 to a liquefaction vessel 12. The rotary kiln 10 is generally of conventional design consisting basically of a cylindrical metallic shell 14 mounted for rotation about a cylindrical axis which is inclined slightly downward from horizontal. The batch material 16 is fed into the cold or inlet end (not shown) of the kiln 10 and conveyed by gravity toward the hot end 18 of the rotary kiln 10. The batch material 16 is discharged into a loading chute 20 which deposits the batch material 16 within the liquefaction vessel 12 which, in the preferred embodiment, is adapted to apply intense heat to the batch in a relatively small space to rapidly convert the batch to a liquefied state. The liquefied material flows out of the vessel 12 into a collecting vessel 22.

With continued reference to FIG. 1, the liquefaction vessel 12 is of the type similar to that disclosed in U.S. Pat. No. 4,519,814 which teachings are hereby incorporated by reference. A steel drum 24 is supported on a circular frame 26 which is in turn mounted for rotation about a generally vertical axis corresponding to the centerline of the drum 24 on a plurality of support rollers 28 and aligning rollers 30. An outlet assembly 32 below the drum 24 includes a bushing 34 with an open center 36 leading to the collecting vessel 22. An upwardly domed refractory lid 38 is provided with stationary support by way of a circular frame 40. The lid 38 includes at least one opening 42 for inserting a burner 44. The burner 44 is preferably a multi-port burner and is preferably fired with oxygen and gaseous fuel such as methane, but can be any type of heat source that produces hot gases that can be used to heat the batch 46 within the vessel 12, e.g., plasma torches.

Within the liquefaction vessel 12, a stable layer of unmelted batch 46 is maintained on the walls of the drum 24 encircling the central cavity within which combustion and liquefaction takes place. The heat from the flame of the burners 44 causes a portion 48 of the batch to become liquefied and flow downwardly through the bottom opening 36. The liquefied batch then flows out of the liquefaction vessel 12 and may be collected in the vessel 22 below the liquefaction vessel 12 for further processing as needed.

The exhaust gases escape upwardly through an opening 50 in the lid 38 and into a transition section 52. The transition section 52 provides the connection between the hot end 18 of the rotary kiln 10 and the liquefaction vessel 12 for the pulverulent batch material 16 and exhaust gas. The transition section 52 includes an exhaust duct 56 that directs exhaust gas into an upper portion of the rotary kiln 10 to preheat the pulverulent batch material and may also include a loading chute 20 to carry the batch 16 therebetween. As an alternative the loading chute 20 may be separated from the transition section 52.

During the liquefaction process various materials in various states become entrained in the hot exhaust gas stream within the vessel 12. For exmple, in a typical soda-lime-silica glass batch these entrained materials may include vapors such as, but not limited to, sodium oxide and particulates such as, but not limited to, sodium sulfate or sodium carbonate, all of which are highly corrosive. In addition, abrasive particulates within the vessel 12 may be combined with the hot exhaust gas to form a corrosive and abrasive gas stream that circulates within the vessel.

Figure 2:
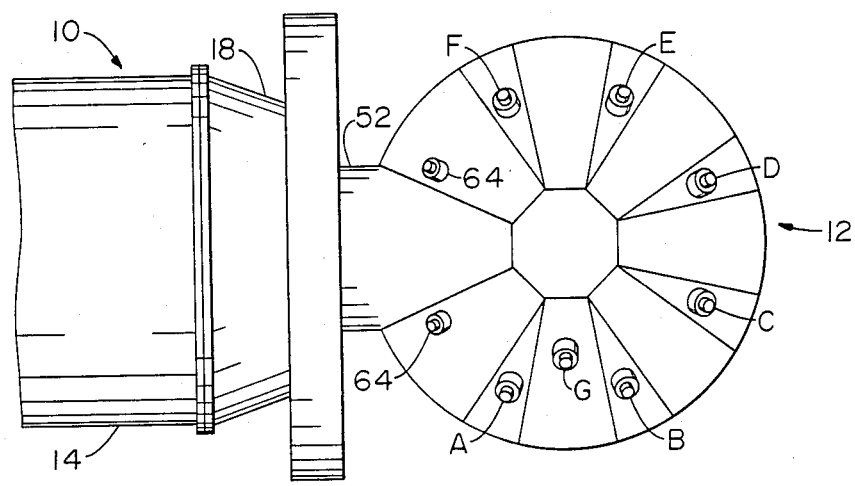
FIG. 2 is a top view of the two-stage liquefaction process arrangement shown in FIG. 1

Referring to FIG. 2, the preferred embodiment of the vessel 12 includes a plurality of burners A, B, C, D, E, and F. Due to the presence of the outlet opening 50 and exhaust duct 56, the positioning of the burners A through F is asymmetric about the vertical centerline of the drum 24 as shown in FIG. 2. In addition, a single burner G may be positioned in the lid 38 and directed directly at the bushing 34 to maintain a positive pressure at the outlet assembly 32 of the vessel 12. As will be appreciated, the number of burners and their position relative to one another and the rotating axis of the vessel is not limiting to the present invention.

Figure 3:
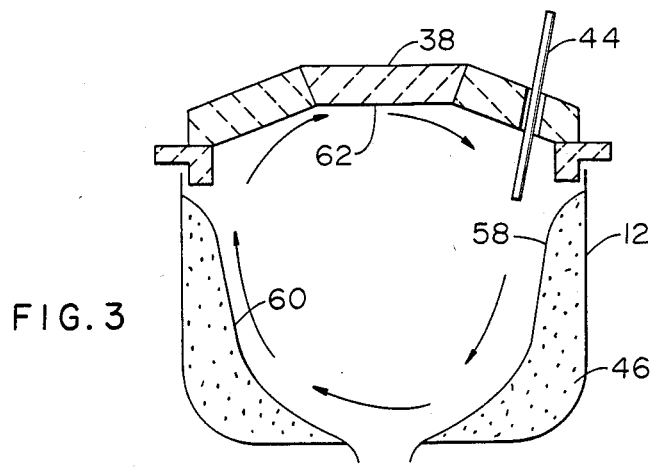
FIGS. 3, 4, 5, and 6 are schematics illustrating the different exhaust gas circulation patterns achieved within the heating vessel in accordance with the teachings of this invention.

With reference to FIG. 3 as a single burner 44 fires, it directs a flame and corresponding hot exhaust gas stream within the vessel 12. The downward momentum of the flame forces the exhaust gas down, across surface portions 58 of the batch 46 and up the opposite surface portion 60, establishing a circulating pattern as shown in FIG. 3. As the stream moves down surface 58 and up the opposite surface 60, it may pick up particulates that become entrained in the exhaust gas, as well as combine with corrosive materials and gases resulting from the liquefaction operation. As the gas circulates past exposed portions of the vessel 12, such as the lid 38, the hot gas may react with the exposed inner surfaces 62 of the lid 38 and corrode it as well as erode it due to the entrained abrasive particulates. This condition is further aggravated when the exhaust gas circulates past the batch loading chute 20 (shown in FIG. 1 only) and picks up additional incoming batch particulates as soon as it enters the vessel 12.

Figure 4:
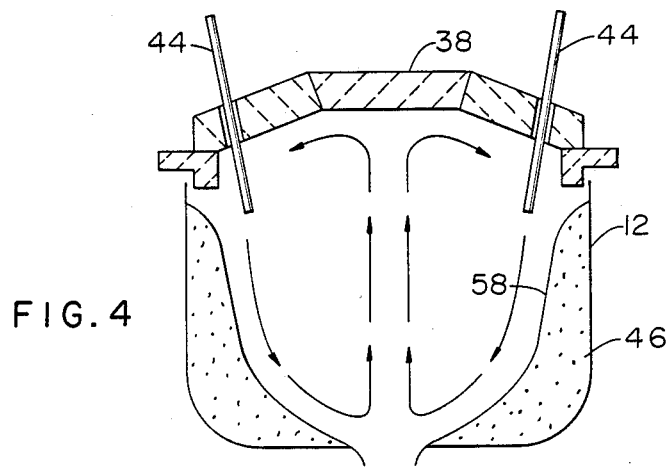

When a pair of burners are positioned 180° apart along the lid 38, e.g. burners A and E as shown in FIG. 2, and are fired at the same firing rate, i.e., oxygen and fuel gas are burned at each burner at the same rate, the hot exhaust gases tend to circulate as shown in FIG. 4 because each of the burners A and E effectively neutralizes the circulation of the other at the lower portion of the vessel 12. The circulation pattern reduces the amount of batch surfaces 48 that the exhaust gas passes over by preventing it from circulating up an opposite side within the vessel 12 and thus reduces the amount of entrained particulates in the exhaust gas. As a result there is less concentrated entrained material in the exhaust gas to effect the lid 38.

Figure 5:
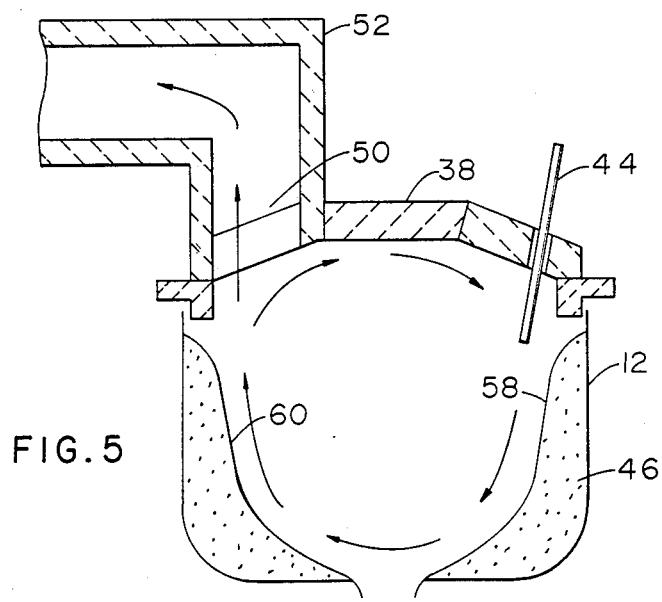

As the burners A through G are fired, the interior of the vessel 12 builds an internal pressure. As shown in FIG. 5, the opening 50 provides a pressure relief outlet but in doing so, the high pressure exhaust gas tends to circulate at high velocities toward the lower pressure outlet 50 and out the exhaust duct 56 in an effort to equalize the internal pressure. This action may tend to concentrate the particulate laden exhaust flow in the vicinity of the outlet 50 and accelerate the wear of the vessel 12 and lid 38 in the vicinity of outlet 50 as well as in the transition section 52. Furthermore, since outlet 50 is the main exhaust gas outlet of the vessel 12, most of the exhaust gas will exit the vessel 12 through the outlet 50. As a result, the magnitude of the volume of exhaust gas exiting through the outlet 50 may further contribute to the accelerated wear.

Referring back to FIG. 2, it can be seen that while burners A and B in the lid 46 generally oppose burners E and F, respectively, i.e., they are diametrically opposed across the lid 38, there are no burners providing an opposing exhaust gas circulation to burners C and D which are positioned generally opposite the exhaust outlet 50. As a result, the exhaust due to burners C and D will circulate the hot exhaust gas down surface 58 and up surface 60, picking up batch particulates as shown in FIG. 5 and accelerate the wear of the lid 36 near the outlet 50. To reduce this accelerated wear of selected portions of the vessel 12 due to the asymmetric positioning of the burners 44 about the centerline of the drum 24 and the location of the outlet 50 in the lid 38, and reduce corrosion and abrasion within the vessel 12, several corrective measures in accordance with this invention may be employed.

Figure 6:
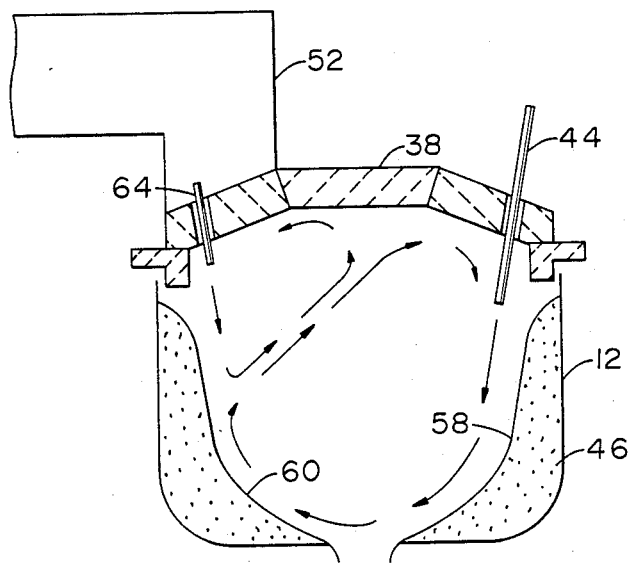

One method to modify circulation within the vessel is to change the firing rates of each of the burners A through G i.e., to allow selected burners to be fired at higher or lower rates than the other burners so as to change their exhaust volume, velocity, and corresponding exhaust gas momentum. By having the firing rate of the burners 44 closest to the outlet 50, i.e., burners A and F, higher than the other burners 44, and in particular burners C and D, a sufficient opposing pressure can be established to direct the exhaust away from surface 60 in the vicinity of the outlet 50 in a circulation pattern as shown in FIG. 6, thus preventing burners C and D from circulating exhaust gas in a pattern similar to that shown in FIG. 5. Furthermore, if the total heat requirement of the vessel 12 for the liquefaction process remains constant, reducing the firing rates of burners C and D relative to the remaining burners will not only reduce the volume and/or velocity of the exhaust gas from burners C and D but also the firing rates of the other burners will be increased, thus further reducing burners C and D's capacity to dominate the circulation within the vessel 12. Table I provides test trial results for the relative firing rates of a burner arrangement with burners A through G similar to that shown in FIG. 2, wherein the accelerated wear of the lid 38 near the outlet 50 was reduced.

TABLE I

| BURNER | RELATIVE FIRING RATE (as compared to burner F) |
| --- | --- |
| A | .95 |
| B | .78 |
| C | .65 |
| D | .66 |
| E | .80 |
| F | 1.00 |
| G | .51 |

As can be seen in Table I, burners A and F have the highest firing rates, while burners C and D have lower firing rates.

A second method of reducing circulation is to create additional pressure within the vessel 12 to oppose the circulation pattern established by burners C and D. In the preferred embodiment, a pair of jet burners 64 may be installed on either side of the exhaust duct 56 at outlet 50 as shown in FIG. 2. These jet burners 64 may be smaller than the burners A through F but are sized to be fired at such a rate as to provide a sufficient opposing exhaust pressure to the circulation pattern established by burners C and D as well as any additional circulation pattern established by the presence of the outlet 50 so that the hot exhaust gas from burners C and D will not simply move down surface 51 and up surface 49 as shown in FIG. 5. As shown in FIG. 6, the jet burners 64 will modify the circulation and direct the upward circulation away from surface 49 thus reducing the amount of surface over which the exhaust stream can pick up particulates from the batch 46. The jet burners 64 are preferably single outlet, oxygen-gas fired burners and with firing end 59 tilted slightly toward the centerline of the vessel 12 and towards the area of the drum 24 beneath the outlet 50 to concentrate the burner flames and opposing exhaust gas pressure directly beneath the outlet 50. Table II provides test trial results for relative firing rates for a burner arrangement similar to that shown in FIG. 2, wherein a pair of jet burners 64 where positioned on either side of the outlet 50.

TABLE II

| BURNER | RELATIVE FIRING RATE (as compared to burner F) |
| --- | --- |
| A | .90 |
| B | .68 |
| C | .44 |
| D | .76 |
| E | .73 |
| F | 1 |
| G | 1.01 |
| 64 | .18 |
| 64 | .18 |

In viewing the results shown in Table II it can be seen that in this trial the firing rate of burner C was reduced much more than the firing rate of burner D, but it should be noted that the total combined relative firing rates of burners C and D (1.20) is still less than the combined firing rates of burners B and E (1.41) and significantly less than the combined firing rates of burners A and F (1.90). The inclusion of jet burner 64 further reduced the abrasive and corrosive effects of the exhaust gas in the vicinity of outlet 50.

It should be appreciated that if the total amount of heat energy within the vessel 12 remains constant for a given operating condition, the addition of jet burners 64 into the vessel may reduce the firing requirements for the remaining burners A through F since jet burners 64 are an additional heat source. As a result not only may the exhaust stream from burners C and D be directed away from surface 60 but also the total actual velocity and volume of the exhaust from burners C and D may be reduced due to the additional heat supplied by jet burner 62. This further reduces the deleterious effect of the burners C and D exhaust circulation. As the firing rate of jet burners 64 increases, the exhaust gas circulation pattern within vessel 12 changes from that shown in FIG. 5 (no burner 64) to FIG. 6 (burners 64 do not fully equalizng burners C and D) to FIG. 4 (jet burners 64 equalize burners C and D).

Figure 7:
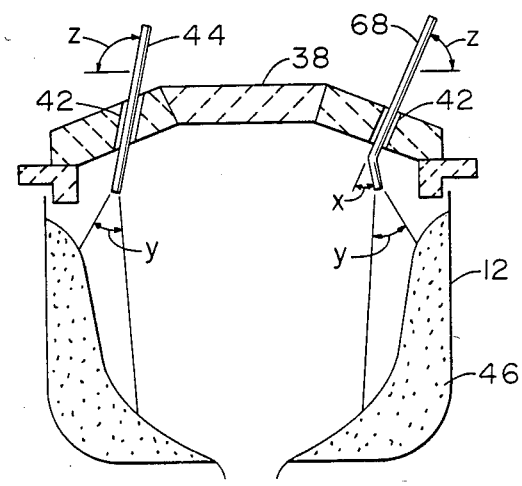
FIG. 7 is a schematic of a heating vessel showing burner configurations incorporating features of the invention.

A third method to modify the exhaust gas circulation is to change the tilt angle of the burners C and D. By tilting the burners C and D as shown in the left side of FIG. 7, the flame from the firing end 66 of the burner is oriented more directly toward the batch wall 46 so that the flow component of the exhaust gas directed downward along the batch wall 46 is reduced. As a result there is less total exhaust gas flow that is directed downwardly along the surface 58 of the batch wall 46 and up the opposite side 60. This in turn may reduce the amount of particulate batch material entrained in the exhaust gas. As can be seen in the left side of FIG. 7, as a burner 44 is tilted, the opening 42 in the lid 38 to accommodate the burner 44 gets longer. In addition, as the curvature of the lid 38 increases, the length of opening 42 increases and may require burner 44 to be lengthened. To eliminate the problem of having a longer and correspondingly heavier burner having increased cooling requirements, as well as having a longer burner opening through the lid 38, angled burners 68 may be used, as shown in the right side of FIG. 7. Angled burners 68 may direct their flame back towards the batch wall 46 thus decreasing the exhaust gas flow down the batch wall 46 so that there is less of a driving force up the batch wall 60 on the opposite side while at the same time maintaining the burner length and the burner opening size. As a result the effective tilt angle is modified without changing the actual tilt angle of the burner. For example, as shown in FIG. 7, angled burners 68 with a tip bend angle X of 45°, flame spread angle Y of 30°, and tilt angle Z of 55° through the lid gives the identical coverage as a straight burner oriented at a tilt angle X of 100°, but with shorter burner and shorter burner opening 42 through the lid 38.

As previously stated, the total volume and velocity of the circulation due to burners C and D may be reduced. In addition, there will be less particulate matter entrained in the exhaust gas due to the modification to the circulation resulting from directing the upward exhaust gas flow away from surface 60. As a result, it is expected that any new wear problems resulting from the modified exhaust gas circulation flow, as shown in FIG. 6 will be minimal.

It should be appreciated that although the previous discussion has been directed toward an asymmetric burner configuration in the lid 38 with the outlet opening 50, there are similar problems even if the burners 44 are arranged symmetrically around the rotational centerline of the vessel 12. As stated earlier, the existence of the outlet opening 50 creates a low pressure opening. Most of the exhaust gas circulating within the vessel 12 must exit through the opening 50. The exhaust gas naturally tends to circulate toward the opening 50 to equalize the pressure within the vessel 12. In other words even though the burners 44 are disposed symmetrically above the vessel 12, the circulation within the vessel 12 is not symmetric. In order to control the circulation of hot exhaust gases within the vessel 12 any of the disclosed arrangements may be used.

It should be appreciated that each of the alternatives taught herein may be used to control exhaust gas circulation and reduce the wear and corrosion problems due to the exhaust gas circulation patterns within the vessel 12 and that these alternatives can be used either individually or in combination with each other.

A form of the invention described and illustrated herein represents a description of an illustrative preferred embodiment thereof. It is understood that various changes may be made without departing from the gist of the invention defined in the claimed subject matter that follows.

We claim:

1. An improved method of controlling flow patterns of discharge gas from burners mounted in a heating vessel having batch material generally disposed along walls of the vessel, encircling a central cavity, wherein the gas flow patterns include at least one burner discharge gas flow pattern that circulates downwardly over a first batch material surface portion and upwardly over a second batch material surface portion and further wherein excessive particulate material from said batch material becomes entrained in said gas as said gas passes over said batch material surface portions and degrades selected exposed surfaces within the vessel, the improvement comprising:

redirecting said at least one gas flow pattern of said burner discharge gas within said vessel away from at least a portion of said second batch material surface whereby the amount of particulate material entrained in said at least one burner discharge gas flow pattern is reduced to an acceptable level and the content of said particulate entrained gas with said exposed surfaces of said vessel is reduced.

2. An improved method of controlling flow patterns of discharge gas from burners mounted in a heating vessel having batch material generally disposed along walls of the vessel, encircling a central cavity, wherein the gas flow patterns include at least one burner discharge gas flow pattern that circulates downwardly over a first batch surface portion and upwardly over a second batch surface portion and further wherein excessive particulate material from said batch material becomes entrained in said gas as said gas passes over said batch material surface portions and degrades selected exposed surfaces within said vessel, the improvement comprising:

adjusting firing rates for selected ones of said burners so as to redirect said at least one burner discharge gas flow pattern within said vessel away from at least a portion of the said second batch surface portion whereby the amount of particulate material entrained in said at least one burner discharge gas flow pattern is reduced to an acceptable level and the contact of said particulate entrained gas with said exposed surfaces of the vessel is reduced.

3. The method as in claim 2 wherein said vessel includes a lid and an burner discharge gas outlet and said plurality of burners includes a first burner spaced a first distance from said gas outlet and a second burner spaced a second distance greater than said first distance from said gas outlet and wherein said readjusting step includes firing said first burner at a rate higher than said second burner.

4. The method as in claim 3 wherein firing rate is a function of the fuel consumption and burner discharge gas velocity of said burner.

5. The method as in claim 3 further including the step of directing high velocity discharge gas from a jet burner in a direction along said second surface portion to redirect said at least one burner discharge gas flow pattern as it circulates over said second batch surface portion in the vicinity of said outlet.

6. The method as in claim 5, further including the step of angling at least one of said burners to reduce the flow of said at least one burner discharge gas flow pattern along said first surface portion such that less gas flow from said at least one burner discharge gas flow pattern circulates down over said first batch surface protion and up over said second batch surface portion in the vicinity of said outlet.

7. The method as in claim 3, further including the step of angling at least one of said burners to reduce the flow of said at least one burner discharge gas flow pattern along said first batch surface portion such that less gas flow from said at least one burner discharge gas flow pattern circulates down over said first batch surface portion and up over said second batch surface portion in the vicinity of said outlet.

8. An improved method of controlling flow patterns of discharge gas from burners mounted in a heating vessel having batch material generally disposed along walls of the vessel, encircling a central cavity, wherein the gas flow patterns include at least one burner discharge gas flow pattern that circulates downwardly over a first batch surface portion and upwardly over a second batch surface portion and further wherein excessive particulate material from said batch material becomes entrained in said gas as said gas passes over said batch material surface portions and degrades selected exposed surfaces within the vessel, the improvement comprising:
   positioning at least one jet burner having a high discharge gas velocity in said vessel; and
   directing said jet discharge gas in a direction opposing said at least one burner discharge gas flow pattern to redirect said at least one burner discharge gas flow pattern away from over at least a portion of said second batch surface portion whereby the amount of particulate material entrained in said at least one burner discharge gas flow pattern is reduced to an acceptable level and the contact of said particulate entrained gas with said exposed surfaces of said vessel is reduced.

9. The method as in claim 8 wherein said vessel includes a lid and burner discharge and jet discharge gas outlet and said jet burner is positioned in close proximity to said outlet, and said directing step including directing said high velocity discharge gas from said jet burner in a direction opposing said at least one burner discharge gas flow pattern as it circulates up and over said second batch surface portion in the vicinity of said outlet.

10. A method as in claim 9 further including the step of adjusting firing rates for said burners such that the firing rate of first selected burners is different from the firing rate of second selected burners so as to redirect said at least one burner discharge gas flow pattern as it circulates over said second batch surface portion in the velocity of said outlet.

11. The method as in claim 10, further including the step of angling at least one of said burners to reduce the flow of said at least one burner discharge gas flow pattern along said first surface portion such that less gas flow from said at least one burner discharge gas flow pattern circulates down over said first batch surface portion and up over said second batch surface portion in the vicinity of said outlet.

12. The method as in claim 9, further including the step of angling at least one of said burners to reduce the flow of said at least one burner discharge gas flow pattern along said first surface portion such that less gas flow from said at least one burner discharge gas flow pattern circulates down over said first batch surface portion and up over said second batch surface portion in the vicinity of said outlet.

13. An improved method of controlling flow patterns of discharge gas from burners mounted in a heating vessel having batch material generally disposed along walls of the vessel, encircling a central cavity wherein said burners are angled such that said burner discharge gas has a first flow component normal to a first batch surface portion and a second flow component generally along said first batch surface portion, and further wherein the gas flow patterns include at least one burner discharge gas flow pattern that circulates downwardly over said first batch surface portion and upwardly over a second batch surface portion such that excessive particulate material from said batch material becomes entrained in said gas as said gas passes over said batch material surface portions and degrades selected exposed surfaces within the vessel, the improvement comprising:
   adjusting the angle of at least one of said burners to reduce said second flow component of said at least one burner discharge gas flow pattern directed downwardly along said first batch surface portion and upwardly over said second batch surface portion, whereby the amount of particulate material entrained in said at least one burner discharge gas flow pattern is reduced to an acceptable level and the contact of said particulate entrained gas with said exposed surface of said vessel is reduced.

14. The method as in claim 13 wherein said vessel includes a lid and an exhaust outlet and further including the step of directing high velocity discharge gas from a jet burner mounted in said heating vessel in a direction along said second batch surface portion to redirect said at least one burner discharge gas flow pattern as it circulates over said second batch surface portion.

15. A method as in claim 14 further including the step of adjusting firing rates for said burners such that the firing rate of first selected burners is different from the firing rate of second selected burners so as to redirect said at least one burner discharge gas flow pattern as it circulates over said second batch surface portion in the velocity of said outlet.

16. A method as in claim 13, further including the step of adjusting firing rates for said burners such that the firing rate of first selected burners is different from the firing rate of second selected burners so as to redirect said at least one burner discharge gas flow pattern as it circulates over said second batch surface portion in the velocity of said outlet.

* * * * *

UNITED STATES PATENT AND TRADEMARK OFFICE
CERTIFICATE OF CORRECTION

PATENT NO. : 4,738,702

DATED : April 19, 1988

INVENTOR(S) : Jeffrey S. Yigdall and Yih-Wan Tsai

It is certified that error appears in the above-identified patent and that said Letters Patent is hereby corrected as shown below:

Claim 1 (column 8, line 37), please delete "content" and replace it with "contact".

Signed and Sealed this

Eighteenth Day of October, 1988

Attest:

DONALD J. QUIGG

Attesting Officer

Commissioner of Patents and Trademarks